(12) United States Patent
Healy, Jr. et al.

(10) Patent No.: US 9,291,711 B2
(45) Date of Patent: Mar. 22, 2016

(54) COMPRESSIVE RADAR IMAGING TECHNOLOGY

(75) Inventors: Dennis M. Healy, Jr., Hyattsville, MD (US); Kathy Hart, legal representative, Hyattsville, MD (US); Vishal M. Patel, Laurel, MD (US); Glenn R. Easley, Fairfax, VA (US); Ramalingam Chellappa, Potomac, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 1212 days.

(21) Appl. No.: 13/035,482

(22) Filed: Feb. 25, 2011

(65) Prior Publication Data

US 2014/0077989 A1 Mar. 20, 2014

Related U.S. Application Data

(60) Provisional application No. 61/308,211, filed on Feb. 25, 2010.

(51) Int. Cl.
*G01S 13/90* (2006.01)
*G01S 13/00* (2006.01)

(52) U.S. Cl.
CPC .............. *G01S 13/9035* (2013.01); *G01S 13/90* (2013.01)

(58) Field of Classification Search
CPC ......... G01S 13/02; G01S 13/06; G01S 13/08; G01S 13/10; G01S 13/26; G01S 13/28; G01S 13/88; G01S 13/89; G01S 13/90; G01S 13/9035; G01S 13/9094; G06T 7/0002; G06T 7/0012; G06T 11/003; G01R 33/20; G01R 33/44; G01R 33/48; G01R 33/54; G01R 33/56; G01R 33/561
USPC ............ 342/25 R–25 F, 82, 89, 90, 175, 176, 342/179, 192–197, 13–15, 21, 22, 118, 128, 342/130–132, 134–145; 324/300, 307; 382/100, 103, 128, 131, 232, 233, 235, 382/244–253; 341/50, 87; 348/61, 143, 348/571; 702/1, 57, 66–78, 127, 189–199
See application file for complete search history.

(56) References Cited

U.S. PATENT DOCUMENTS

| 4,072,949 | A | * | 2/1978 | Van Brunt ........................ 342/15 |
| 4,704,737 | A | * | 11/1987 | Estrick et al. .................. 342/132 |
| 4,866,448 | A | * | 9/1989 | Rocca et al. ................. 342/25 D |
| 5,079,735 | A | * | 1/1992 | Apostolos ...................... 342/192 |

(Continued)

OTHER PUBLICATIONS

Desai, Mita D. et al., "Convolution Backprojection Image Reconstruction for Spotlight Mode Synthetic Aperture Radar", IEEE Transactions on Image Processing, vol. 1, No. 4, Oct. 1992, pp. 505-517.

(Continued)

*Primary Examiner* — Bernarr Gregory
(74) *Attorney, Agent, or Firm* — Squire Patton Boggs (US) LLP

(57) ABSTRACT

A method, apparatus and computer-readable medium is provided that can utilize an undersampling method and can produce a radar image of a target. The radar image of the target can be based on a collection of waveform measurements, where the collection can be based on a significantly reduced number of transmitted and received electromagnetic pulse waveforms.

19 Claims, 11 Drawing Sheets

(56) References Cited

U.S. PATENT DOCUMENTS

| | | | |
|---|---|---|---|
| 5,943,006 A * | 8/1999 | Crane et al. | 342/196 |
| 6,067,043 A * | 5/2000 | Faure et al. | 342/135 |
| 6,552,677 B2 * | 4/2003 | Barnes et al. | 342/22 |
| 7,245,250 B1 * | 7/2007 | Kalayeh | 342/25 R |
| 7,271,747 B2 * | 9/2007 | Baraniuk et al. | 341/87 |
| 7,307,580 B2 * | 12/2007 | Sherman et al. | 342/196 |
| 7,411,540 B1 * | 8/2008 | Lopez et al. | 342/25 R |
| 7,439,906 B1 * | 10/2008 | Blunt et al. | 342/195 |
| 7,646,924 B2 * | 1/2010 | Donoho | 382/232 |
| 7,688,068 B2 * | 3/2010 | Beatty | 324/307 |
| 7,714,768 B2 * | 5/2010 | Sherman et al. | 342/196 |
| 7,876,257 B2 * | 1/2011 | Vetro et al. | 342/25 F |
| 7,928,893 B2 * | 4/2011 | Baraniuk et al. | 342/25 F |
| 7,944,392 B2 * | 5/2011 | Falk | 342/195 |
| 8,014,616 B2 * | 9/2011 | Chakraborty et al. | 382/233 |
| 8,077,988 B2 * | 12/2011 | Donoho | 382/232 |
| 2009/0222226 A1 * | 9/2009 | Baraniuk et al. | 702/66 |

OTHER PUBLICATIONS

Donoho, David L., "Compressed Sensing", IEEE Transactions on Information Theory, vol. 52, No. 4, Apr. 2006, pp. 1289-1306.

Candes, Emmunel J., et al., "Robust Uncertainty Principles: Exact Signal Reconstruction from Highly Incomplete Frequency Information", IEEE Transactions on Information Theory, vol. 52, No. 4, Feb. 2006, p. 489-509.

Mobley, Stacie G., et al., "Synthetic Aperture Radar with a Non-Uniform Pulse Repetition Interval", US Army Missile Command, University of Alabama—Huntsville, 1995 IEEE, pp. 498-502.

Baraniuk, Richard, et al., "Compressive Radar Imaging", Dept. of Electrical & Computer Engineering & EP Wigner Institute, 2007 IEEE, pp. 128-133.

Gurbuz, A.C. et al., "A Compressive Sensing Data Acquisition and Imaging Method for Stepped Frequency GPRs", IEEE Transactions on Signal Processing, downloaded Jun. 8, 2009, pp. 1-9.

Herman, Matthew A. et al., "High-Resolution Radar via Compressed Sensing", IEEE Transactions on Signal Processing, vol. 57, No. 6, Jun. 2009, pp. 2275-2284.

Bhattacharya, Sujit, et al., "Fast Encoding of Synthetic Aperture Radar Raw Data Using Compressed Sensing", Edinburgh University, EH9 3JL, 2007 IEEE, pp. 448-452.

Cetin, Mujdat, et al., "Feature-Enhanced Synthetic Aperture Radar Image Formation Based on Nonquadratic Regularization", IEEE Transactions on Signal Processing, vol. 10, No. 4, Apr. 2001, pp. 623-631.

Baraniuk, Robert, "Compressive Sensing", IEEE Signal Processing Magazine, Jul. 2007, pp. 118-124.

Rudelson, Mark et al., "On Sparse Reconstruction from Fourier and Gaussian Measurements", Oct. 9, 2006, pp. 1-19.

Tropp, Joel A., et al., "Signal Recovery from Random Measurements Via Orthogonal Matching Pursuit", IEEE Transactions on Information Theory, vol. 53, No. 12, Dec. 2007, pp. 4655-4666.

Balakrishnan, A.V., "On the Problem of Time Jitter in Sampling", IRE Transactions on Information Theory, Apr. 1962, pp. 226-236.

Romberg, Justin, "Compressive Sensing by Random Convolution", Jul. 9, 2008, pp. 1-30.

Chen, Scott S. et al., "Atomic Decomposition by Basis Pursuit", Stanford University, pp. 1-29 (1998).

Candes, Emamnuel J., "Compressive Sampling", Proceedings of Int. Congress of Mathematicians, Madrid, Spain 2006, pp. 1-20.

Van Den Berg, Ewout, "Probing the Pareto Frontier for Basis Pursuit Solutions", University of British Columbia, Jan. 2008, pp. 1-23.

Hennenfent, Gilles et al., "Simply Denoise: Wavefield Reconstruction via Jittered Undersampling", University of British Columbia, Vancouver, V6T 1Z4, BC, Canada, pp. 1-28.

* cited by examiner

Fig.8A  Cross-range frequency

Fig.8B  Cross-range

Fig.8C  Cross-range frequency

Fig.8D  Cross-range

Cross-range

COMPRESSIVE RADAR IMAGING TECHNOLOGY

CROSS REFERENCE TO RELATED APPLICATIONS

This application claims priority of U.S. Provisional Patent Application Ser. No. 61/308,211, filed on Feb. 25, 2010. The subject matter of the earlier filed application is hereby incorporated by reference.

BACKGROUND

1. Field

Certain embodiments of the invention relate generally to radar imaging, and, more particularly, to synthetic aperture radar (SAR) imaging.

2. Description of the Related Art

SAR is a radar imaging technology that is capable of producing high resolution images of stationary surface targets and terrain. One of the defining characteristics of SAR is its use of relative motion between a radar antenna and its target to provide distinctive long-term coherent-signal variations that can be exploited to obtain a finer spatial resolution than is possible with conventional beam-scanning systems. One of the main advantages of SAR is its ability to operate at night and in all weather conditions, hence overcoming limitations of both optical and infrared systems.

SUMMARY

According to an embodiment of the invention, a method includes transmitting a plurality of electromagnetic pulse waveforms towards a target using an undersampling method. The method further includes receiving a plurality of reflected electromagnetic pulse waveforms that are reflected by the target. The method further includes processing the plurality of reflected electromagnetic pulse waveforms to create a first collection of waveform measurements by converting each reflected electromagnetic pulse waveform into a waveform measurement, where the first collection of waveform measurements is a compressed representation of a second collection of waveform measurements. The method further includes constructing a second collection of waveform measurements based on the first collection of waveform measurements using an optimization method that includes estimating any waveform measurements of the second collection of waveform measurements not present in the first collection of waveform measurements. The method further includes creating a radar image of the target using the second collection of waveform measurements.

According to another embodiment, an apparatus includes a memory including instructions. The apparatus further includes a transceiver configured to transmit a plurality of electromagnetic pulse waveforms towards a target using an undersampling method. The transceiver is further configured to receive a plurality of reflected electromagnetic pulse waveforms that are reflected by the target. The apparatus further includes a processor configured to process the plurality of reflected electromagnetic pulse waveforms to create a first collection of waveform measurements by converting each reflected electromagnetic pulse waveform into a waveform measurement, where the first collection of waveform measurements is a compressed representation of a second collection of waveform measurements. The processor is further configured to construct a second collection of waveform measurements based on the first collection of waveform measurements using an optimization method and further configured to estimate any waveform measurements of the second collection of waveform measurements not present in the first collection of waveform measurements. The processor is further configured to create a radar image of the target using the second collection of waveform measurements.

According to another embodiment, a computer-readable medium includes a computer program stored thereon that, when executed by a processor, causes the processor to implement a method. The method includes transmitting a plurality of electromagnetic pulse waveforms towards a target using an undersampling method. The method further includes receiving a plurality of reflected electromagnetic pulse waveforms that are reflected by the target. The method further includes processing the plurality of reflected electromagnetic pulse waveforms to create a first collection of waveform measurements by converting each reflected electromagnetic pulse waveform into a waveform measurement, where the first collection of waveform measurements is a compressed representation of a second collection of waveform measurements. The method further includes constructing a second collection of waveform measurements based on the first collection of waveform measurements using an optimization method that includes estimating any waveform measurements of the second collection of waveform measurements not present in the first collection of waveform measurements. The method further includes creating a radar image of the target using the second collection of waveform measurements.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein:

FIGS. 8A, 8B, 8C, 8D, and 8E illustrate examples of collected waveform measurements and images reconstructed from the collected waveform measurements using an undersampling method, as compared to a traditional sampling method, according to another embodiment of the invention.

DETAILED DESCRIPTION

Figure 1:
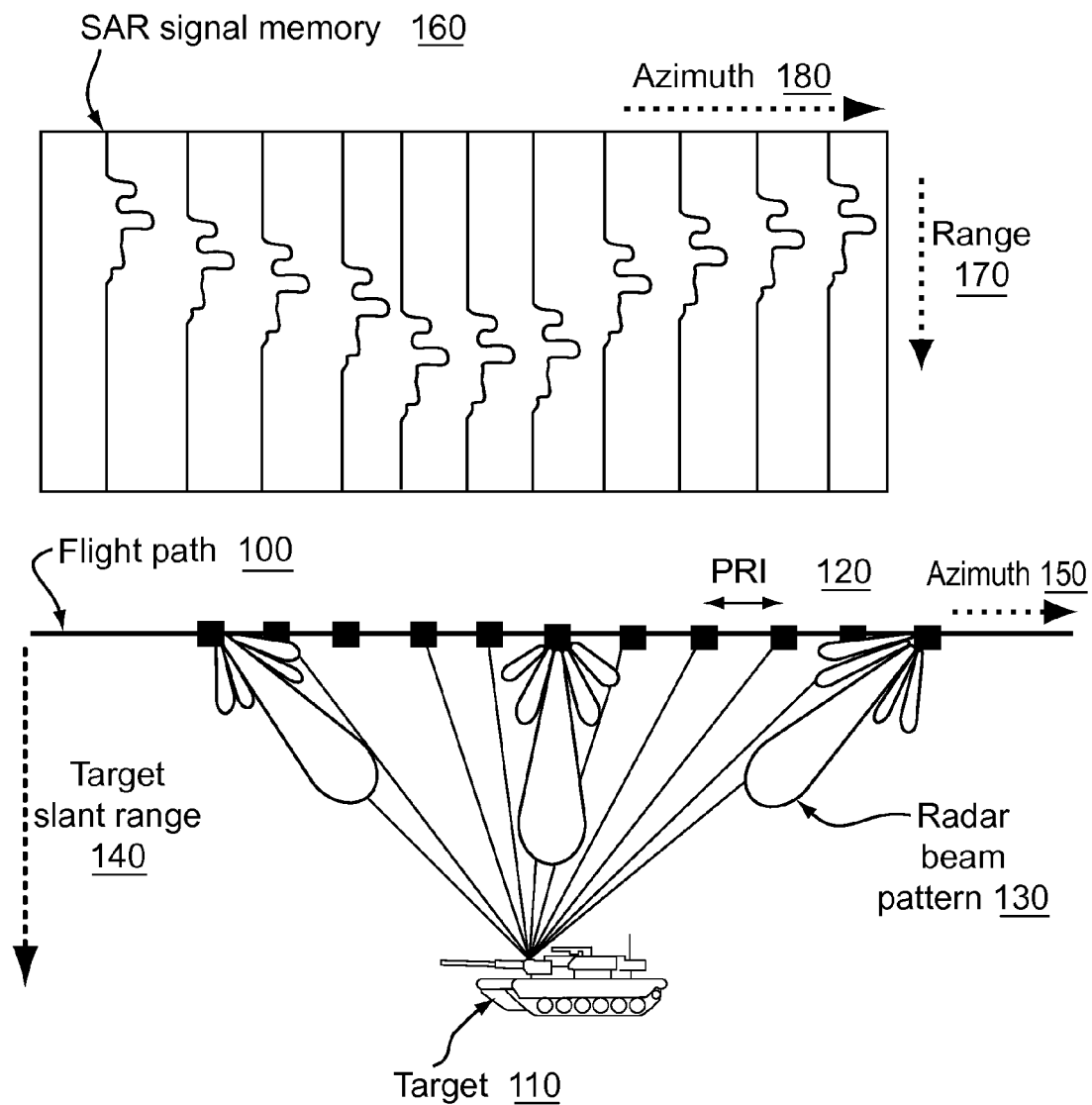
FIG. 1 illustrates a diagram of spotlight mode SAR and illustrates how received data is placed into a two-dimensional signal array, according to an embodiment of the invention.

It will be readily understood that the components of the present invention, as generally described and illustrated in the figures herein, may be arranged and designed in a wide variety of different configurations. Thus, the following detailed description of the embodiments of a method, apparatus, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "an embodiment," "one embodiment," "an alternative embodiment," "certain embodiments," "some embodiments," "different embodiments" or other similar language, throughout this specification refers to the fact that a particular feature, structure, or characteristic described in connection with the embodiment may be included in at least one embodiment of the present invention. Thus, appearances of the phrases "an embodiment," "one embodiment," "an alternative embodiment," "in certain embodiments," "in some embodiments," "in other embodiments," "in different embodiments," or other similar language, throughout this specification do not necessarily all refer to the same group of embodiments, and the described features, structures, or characteristics may be combined in any suitable manner in one or more embodiments.

According to an embodiment of the invention, a method, apparatus, and computer-readable medium is provided that utilizes a novel SAR image formation algorithm. The SAR image formation algorithm can reduce the number of transmitted and/or received electromagnetic pulse waveforms (also identified as pulses or waveforms) required to form an SAR image. The SAR image formation algorithm is based on a recently introduced theory of compressed sensing (CS) which allows for the reduction of the number of transmitted and/or received waveforms. According to the embodiment, when an SAR image is sparse in a transform domain, one can reconstruct an estimate of a reflectivity profile of a target using the novel image formation algorithm, relying on a far fewer number of waveforms than conventional image formation systems. Furthermore, according to the embodiment, by utilizing this novel SAR image formation algorithm, one is not required to make any changes the hardware of an existing radar system.

SAR will now be discussed in greater detail. As understood by one of ordinary skill in the art, in SAR, a radar can be mounted on a moving platform, such as an automobile, aircraft or spacecraft, so that the radar moves along a fixed path. As the radar moves along the path, the radar transmits electromagnetic pulse waveforms at microwave frequencies toward a target or terrain, using an antenna. The radar can transmit the electromagnetic pulse waveforms at a uniform, or regular, pulse repetition interval, which is defined as 1/PRF where PRF is a pulse repetition frequency. The reflected energy at any instant can be modeled as a convolution of the electromagnetic pulse waveform with a ground reflectivity function. Each received electromagnetic pulse waveform is then pre-processed and passed on to an image formulation processor. The image formation processor produces an image that is a two-dimensional mapping of the target.

There are at least four modes of SAR: stripmap, scan, spotlight, and inverse SAR (ISAR). In stripmap mode SAR, a pointing direction of the radar antenna is fixed, and an image is formed with a width that equals a swath of the radar, and a length that equals the length of the path of the radar. In scan mode SAR, the pointing direction of the radar antenna is continuously modified along the path of the radar, and the image is formed with a width that equals several sub-swaths of the radar, and a length that equals the length of the path of the radar. In spotlight mode ISAR, the pointing direction of the radar antenna is continuously modified to illuminate the same target being imaged. Thus, a spotlight mode SAR can provide higher resolution than the stripmap mode SAR and the scan mode SAR, because the spotlight mode SAR maps the target at multiple viewing angles during a single pass. In ISAR, the radar is stationary, and the target is moving. The angular motion of the target with respect to the radar can be used to form an image of the target. Differential Doppler shifts of adjacent scatters on the target are observed, and the target's reflectivity function is obtained through the Doppler frequency spectrum.

Thus, in SAR, motion of a radar antenna (or in the case of ISAR, the motion of the target) is used to synthesize a long radar antenna. As previously described, as a radar advances along its path at a constant velocity, electromagnetic pulse waveforms are transmitted and received by the radar. Electromagnetic pulse waveforms can be transmitted at a uniform, or regular, pulse repetition interval (PRI), which is defined as 1/PRF where PRF is a pulse repetition frequency. As also discussed, the reflected energy at any instant can be modeled as a convolution of the electromagnetic pulse waveform with a ground reflectivity function.

Furthermore, in SAR, a two-dimensional image that is formed by a radar can be interpreted in the dimensions of range and cross-range, or azimuth. A range is a direction of a signal propagation produced by the radar. A cross-range is a direction parallel to a flight path of the radar. Range samples can be referred to as fast-time samples, and cross-range samples can be referred to as slow-time samples. The range resolution of a SAR image is directly related to a bandwidth of a transmitted signal and the cross-range resolution is inversely proportional to a length of an antenna aperture of the radar. Therefore, high range resolution can be achieved by transmitting wide bandwidth electromagnetic pulse waveforms, and high cross-range resolution can be achieved by coherently processing reflected electromagnetic pulse waveforms transmitted from a variety of positions along a flight path of the radar to emulate a large aperture.

Methods for obtaining a SAR image can be based on using interpolation and a Fourier transform. Interpolation, as understood by one of ordinary skill in the art, is a method of constructing new data points with a range of a discrete set of known data points. A Fourier transform, as also understood by one of ordinary skill in the art, is a mathematical operation that decomposes a signal into its constituent frequencies. One method for obtaining a SAR image is known as a Polar Format Algorithm (PFA). In spotlight mode SAR, a collection of pre-processed waveform measurements (also identified as SAR phase histories or phase histories) define a set of samples in a Fourier space (k-space) of a target on a polar wedge. The PFA obtains a reflectivity function (i.e., a SAR image) by appropriately interpolating the polar data to a Cartesian grid, and taking a two-dimensional inverse Fourier transform. Another SAR image reconstruction method, based on a tomographic formulation of SAR, is a filtered backprojection (FBP) method. Range migration and chirp scaling algorithms can also be used for spotlight mode SAR image reconstruction.

FIG. 1 illustrates a diagram of spotlight mode SAR and illustrates how received data is placed into a two-dimensional signal array, according to an embodiment of the invention. More specifically, FIG. 1 illustrates a flight path 100 of a radar. As previously described, a radar can be mounted on a moving platform, such as an aircraft or spacecraft, that moves along flight path 100. As the radar moves along flight path 100, a radar antenna transmits one or more electromagnetic pulse waveforms towards target 110. Each electromagnetic pulse waveform can be reflected by target 110 and received by the radar antenna. Each electromagnetic pulse waveform can be transmitted at a uniform, or regular, PRI, such as PRI 120. The transmission and reception of a electromagnetic pulse waveform can produce a radar beam pattern, such as radar beam pattern 130. As illustrated in FIG. 1, target slant range 140 represents a range of the radar, and azimuth 150 represents an azimuth or cross-range of the radar. Based on the electromagnetic pulse waveforms received by the radar antenna, a two-dimensional image can be generated and stored in a two-dimensional signal array of SAR signal memory 160. According to the embodiment, range 170 and azimuth 180 of the two-dimensional image stored in SAR signal memory 160 correspond to target slant range 140 and azimuth 150, respectively.

Because a SAR image is a map of a spatial distribution of the reflectivity function of stationary targets and terrain, many SAR images can be sparse or compressible in a representation, such as those from a wavelet or complex wavelet transform. Under the theory of CS, it is possible to recover such sparse images from a small number of random measurements, provided that the undersampling results in noise-like artifacts in a transform domain, and an appropriate nonlinear recovery scheme, or method, is used, in accordance with an embodiment of the invention.

A tomographic formulation of a spotlight SAR, according to an embodiment of the invention, will now be discussed.

Figure 2:
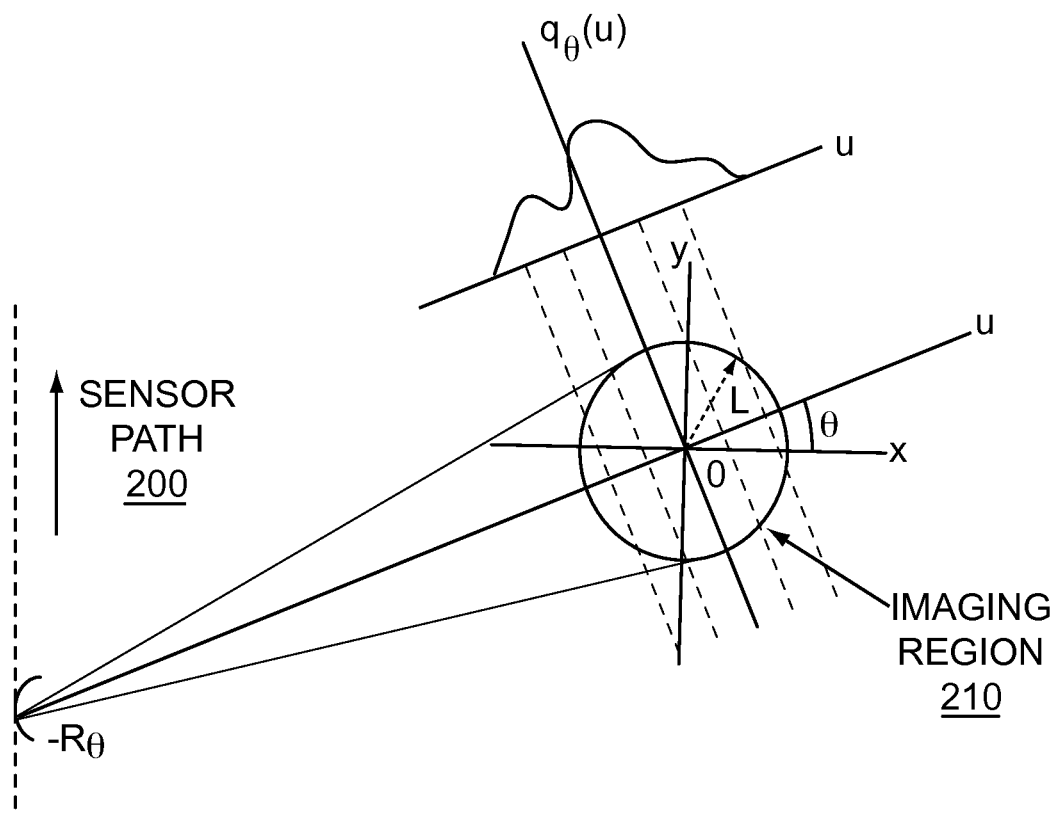
FIG. 2 illustrates a ground plane geometry in a spotlight mode SAR, according to an embodiment of the invention.

FIG. 2 illustrates a ground plane geometry in a spotlight mode SAR, according to an embodiment of the invention. In FIG. 2, a path of a radar is represented as sensor path 200, and a region imaged by the radar is represented as imaging region 210. According to the embodiment, the radar, which transverses sensor path 200, continuously points in the direction of imaging region 210. At locations corresponding to each increment of $\Theta$, high-bandwidth electromagnetic pulse waveforms are transmitted. The returns from imaging region 210 are received and processed to image a reflectivity profile $g(x,y)$. As previously discussed, a reflectivity profile is a representation of a SAR image.

A radar can transmit linear frequency modulation (LFM) chirp pulses described mathematically as a real part of:

$$s(t) \begin{cases} e^{j(w_0 t + \alpha t^2)}, & |t| \leq \frac{T}{2} \\ 0, & \text{otherwise} \end{cases} \quad (1)$$

where $w_O$ is the carrier frequency, $2\alpha$ is the chirp rate and T is the electromagnetic pulse waveform length. The return from the center of imaging region 210 of radius L at the distance, $R_\Theta$ where $\Theta$ denotes the transmission angle, is then mixed with a signal simulating the return from the chosen reference point and lowpass filtered. Neglecting the residual video phase term and assuming $R_\Theta \gg L$, the demodulated signal is given by:

$$r_\Theta = \int\int_D g(x,y)\exp\{-j\Omega(t)(x\cos(\Theta) + y\sin(\Theta))\}dxdy, \quad (2)$$

where $$\Omega(t) = \frac{2}{c}(w_0 + 2\alpha(t - \sigma_0)),$$

c is the speed of light, $$\sigma_0 = \frac{2R_\Theta}{c},$$

and $D=\{(x,y)|x^2+y^2 \leq L^2\}$. Equation (2) represents a projection slice at angle from the Fourier transform of the reflectivity field $g(x,y)$. Using the projection slice theorem, the signal $r_\Theta(t)$ can also be identified as a band pass filtered Fourier transform of the projections of the reflectivity field:

$$r_\Theta(t) = \int_{-L}^{L} q_\Theta(u)\exp\{-j\Omega(t)u\}du \quad (3)$$

where $q_\Theta(u)$ is the projection of the reflectivity field $g(x,y)$ at angle $\Theta$ described as:

$$q_\Theta(u) = \iint_D \delta(u - x\cos(\Theta) - y\sin(\Theta))g(x,y)dxdy. \quad (4)$$

Taking advantage of a formulation of equation (2) that re-expresses $r_\Theta(t)$ as $(A_\Theta g(x,y))(t)$, where $A_\Theta$ is a continuous observation kernel, a matrix-based formulation of an imaging acquisition algorithm can be set up. Assume $r_{\Theta_i}(t_j)$ represents the fast-time samples at the ith observation angle $\Theta_i$ at times $t_j$ of a continuous observation $r_{\Theta_i}(t)$. Also assume $r_{\Theta_i}$ represents the vector of these samples, $A_{\Theta_i}$ represents a discretized approximation to the kernel $A_{\Theta_i}$, and g represents a lexicographically ordered vector of unknown sampled reflectivity field of length N. Then one can write the following equation:

$$\begin{bmatrix} r_{\Theta_1} \\ r_{\Theta_2} \\ \vdots \\ r_{\Theta_{P_N}} \end{bmatrix} = \begin{bmatrix} A_{\Theta_1} \\ A_{\Theta_2} \\ \vdots \\ A_{\Theta_{P_N}} \end{bmatrix} g \quad (5)$$

or $r=Ag$, where $$r = \lfloor r_{\Theta_1}, \ldots r_{\Theta_{P_N}} \rfloor^T,$$

$$A = \lfloor A_{\Theta_1}, \ldots A_{\Theta_{P_N}} \rfloor^T,$$

and $P_N$ is the total number of slow-time samples.

Figure 3:
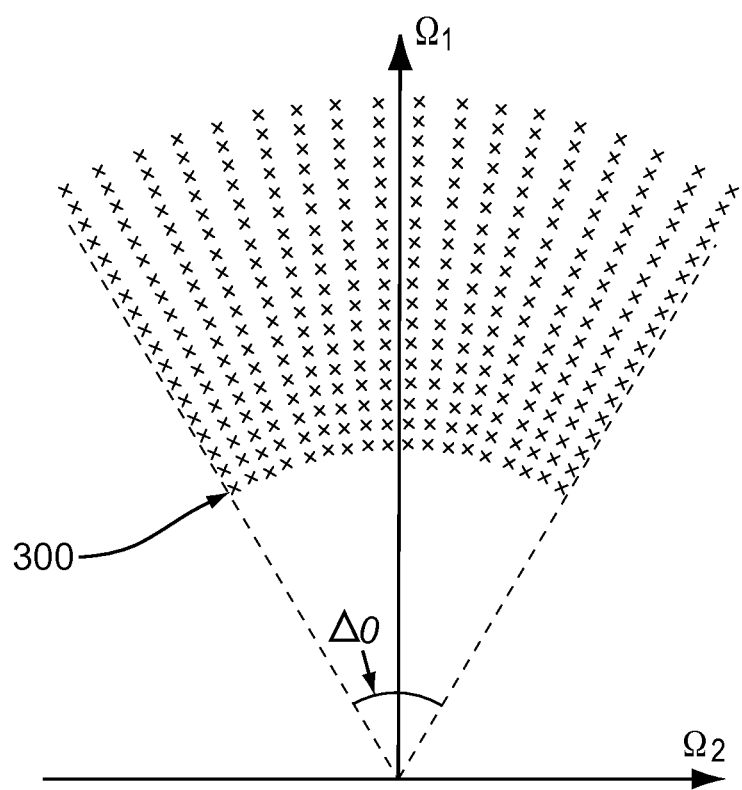
FIG. 3 illustrates a collection of waveform measurements that define a set of samples in a Fourier space of a target on a polar wedge, according to an embodiment of the invention.

The collection of waveform measurements, r, defines a set of samples 300 in the Fourier space of a target on a polar wedge, in accordance with an embodiment of the invention, as illustrated in FIG. 3. Since this system relates the reflectivity profiles to the measurements directly, polar to rectangular sampling is not required. However, given the sampled waveform measurements r, typically PFA is used to estimate a SAR image.

Assuming a presence of additive noise, $\eta$, the SAR model can be expressed as $r=Ag+\eta$. Also assuming a similar SAR model, a regularized $l_p$-norm-based feature-enhanced SAR image formation method can be used. A $l_1$-norm-regularized reconstruction can be used to obtain a sparse estimate of the reflectivity field.

As previously discussed, a signal is required to be sampled at a given frequency in order to be able to reconstruct the signal as a two-dimensional image. According to an embodiment of the invention, CS enables a reconstruction of sparse or compressible signals from a small set of nonadaptive, linear measurements. A measurement of a small set of non-adaptive linear measurements is also known as undersampling. In contrast, a Shannon-Nyquist sampling theorem requires a signal to be sampled at a frequency of twice its bandwidth to be able to reconstruct it exactly. Thus, according to an embodiment, a number of measurements can be much smaller than a number of Nyquist rate samples. In other words, an undersampling method is a method where one samples a signal at a sample rate below a Nyquist rate (i.e., below a frequency of twice the bandwidth) and one is still able to reconstruct the signal. CS will now be discussed in greater detail.

Assume $x \in \mathfrak{R}^N$ is K-sparse in a basis, or more generally a frame $\Psi$, so that $x=\Psi x_0$, with $\|x_0\|_0=K<<N$, where $\|\cdot\|_0$ returns the number of nonzero elements. In the case where x is compressible in $\Psi$, it can be approximated by the best K-term representation. For example, take a random M×N measurement matrix $\Phi$ with M<N, and assume that M linear measurements are made such that $y=\Phi x=\Phi \Psi x_0=\Theta x_0$. According to the theory of CS, when the matrix $\Theta$ has a restricted isometry property (RIP), it is possible to reconstruct x with high probability from a set of $$M = O\left(K\log\left(\frac{N}{K}\right)\right)$$

linear measurements. As understood by one of ordinary skill in the art, a matrix $\Theta$ is said to have a RIP of order k with constants $\delta=\delta_k\in(0,1)$ if:

$$(1-\delta_k)\|v\|_2^2 \leq \|\Theta v\|_2^2 \leq (1-\delta_k)\|v\|_2^2 \quad (6)$$

for any v such that $\|v\|_0 \leq K$. A related condition of RIP requires that the rows of $\Phi$ cannot sparsely represent the columns of $\Psi$ and vice versa. In the case where $\Phi$ is generated from independent and identically distributed random variables (iid) of a Gaussian distribution, and $\Psi$ is a sparsifying basis, then $\Theta$ satisfies the RIP. Among many other ensembles of random matrices that satisfy the RIP, a partial Fourier matrix where M rows of the M×N Fourier matrix selected at random can be included.

When $\Theta$ has the RIP, it is possible to reconstruct x via its coefficients $x_0$, with high probability, by solving the following $l_1$ minimization algorithm:

$$\hat{x}_o = \arg\min_{x_0' \in R^N} \|x_0'\|_1 \text{ subject to } y \quad (7)$$
$$= \Phi \Psi x_0',$$

where $\|\cdot\|_1$ denotes the $l_1$ norm. The optimization algorithm is known as Basis Pursuit (BP). In the case where there are noisy observations, Basis Pursuit De-Noising (BPDN) can be used to estimate the original image. Greedy algorithms like Orthogonal Matching Pursuit (OMP) can also be used to recover sparse images in certain cases.

According to an embodiment of the invention, a collection of waveform measurements can be created so that equation (6) is satisfied, and thus, the collection satisfies the RIP. More specifically, according to the embodiment, the use of a CS undersampling scheme, or method, for SAR can entail a selection of waveform measurements such that equation (6) is satisfied, and thus, the collection of waveform measurements satisfies the RIP. While a CS undersampling method can involve obtaining Fourier samples randomly, sampling a truly random subset of the waveform measurements in SAR is usually impractical for existing hardware. Thus, according to an embodiment, one of two CS k-space undersampling methods for SAR can be used to obtain a collection of waveform measurements that satisfies the RIP. Since a PRF of a radar essentially determines a slow-time sampling rate of the radar, the two CS undersampling methods are based on modifying the PRF of the radar. According to the embodiment, implementation of one of the two undersampling methods can be done involving a minor change to a PRF scheduling of a radar. As understood by one of ordinary skill in the art, any sampling method can introduce artifacts, or errors, in a representation of visual data. While each of the two undersampling methods can introduce artifacts, a Point Spread Function (PSF) is utilized to analyze the severity of artifacts introduced by the undersampling methods, as will be described in more detail.

According to an embodiment, $g \in C^N$ represents a reflectivity map to be imaged. Assume $\Omega$ represents a chosen set of frequencies of size $|\Omega|=M$ with $M<<N$ and $F_\Omega:C^N \to C^M$ denoting a partial Fourier transform operator restricted to $\Omega$. Let $F^*_\Omega$ denote the adjoint operation which can be modeled as zero filling the missing data and taking the inverse Fourier transform. Then, the PSF can be defined as, $PSF(m,n)= (F^*_\Omega F_\Omega)(m,n)$. The PSF measures the aliasing artifacts introduced by the zero filled linear reconstruction (or native reconstruction) from the true source pixels to the other pixels. When all the data points are used for reconstruction, the PSF is measured at zero, or $PSF(m,n)|_{m \neq n}=0$. Thus, undersampling the Fourier space introduces non-zero off-diagonal terms in PSF(m,n). A maximum of a sidelobe-to-peak ratio (SPR) or a maximum off-diagonal entry in a scaled PSF, $$\max_{m \neq n}\left|\frac{PSF(m, n)}{PSF(n, n)}\right|$$

is used as a measure of severity of the aliasing artifacts.

In a case where a sparsifying transformation is used for SAR images, a transform point spread function (TPSF) can be used. If $\Psi$ denotes a sparsifying transform, then the TPSF can be defined as $TPSF(m,n)=(\Psi^* F^*_\Omega F_\Omega \Psi)(m,n)$. In this case, the sidelobes in $\max_{m \neq n}|TPSF(m,n)|$ are used to measure the severity of the aliasing artifacts. The SPR values are always between 0 and 1. Sampling methods that produces SPR values close to 0 are what is desired. According to an embodiment, one of two slow-time undersampling methods can be utilized for SAR to entail a selection of waveform measurements so that equation (6) is satisfied, and thus, the collection of waveform measurements satisfies a RIP. The two slow-time undersampling methods will now be discussed in greater detail.

According to an embodiment of the invention, a radar can utilize a random slow-time undersampling method, the first of the two slow-time undersampling methods. As previously discussed, as a radar advances along a path, electromagnetic pulse waveforms can be transmitted and received by the radar. The electromagnetic pulse waveforms can be transmitted at every $$PRI = \frac{1}{PRF}.$$

Undersampling methods based on sampling at regular intervals can produce strong aliases. In contrast, random changes to the PRI can break up the periodicity of the aliasing artifacts and can covert strong aliases to random noise-like artifacts. Thus, according to an embodiment, a radar can transmit electromagnetic pulse waveforms at random intervals. In contrast to transmitting electromagnetic pulse waveforms with a regular PRI, according to the embodiment, the radar can transmit electromagnetic pulse waveforms at random intervals, and thus, transmit fewer electromagnetic pulse waveforms than traditional SAR systems. This can amount to undersampling the 2D waveform measurements along a slow-time axis randomly, in accordance with the embodiment.

According to an alternate embodiment of the invention, a radar can utilize a jittered slow-time undersampling method, the second of the two slow-time undersampling methods. Jittered undersampling is based on a regular undersampling which is perturbed by random noise. For example, every nth sample (i.e., every nth transmission of a electromagnetic pulse waveform) can be jittered by an amount $\zeta_n$, so that the sample occurs at time $nP+\zeta_n$ where P is the sampling period. As understood by one of ordinary skill in the art, the effects of jitter in one dimension can include attenuation of high frequencies, where the energy lost to the attenuation appears as uniform noise, and the basis structure of the spectrum does not change. Furthermore, as also understood by one of ordinary skill in the art, additive random jitter can eliminate aliasing completely. Thus, according to the embodiment, jitter undersampling can be applied in slow-time.

Figure 4C:
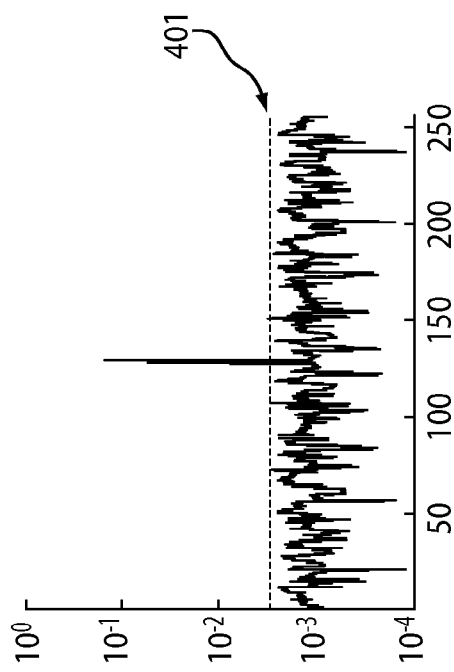
FIGS. 4A, 4B, 4C, 4D, 4E, 4F, 4G, 4H, and 4I illustrate point spread functions for random two-dimensional undersampling, random slow-time undersampling, and jittered slow-time undersampling, according to an embodiment of the invention.
Figure 4F:
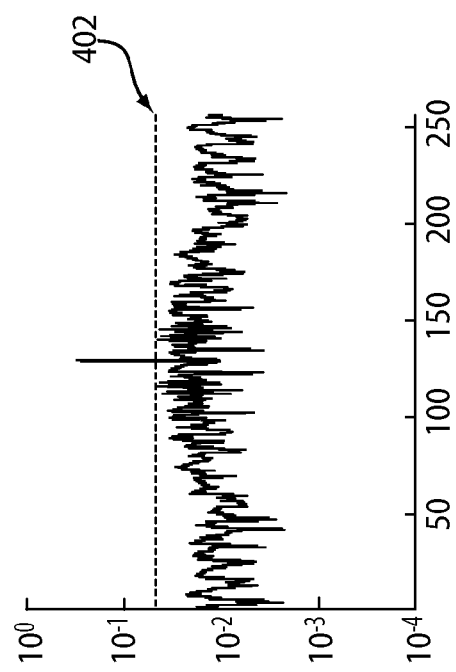
Figure 4B:
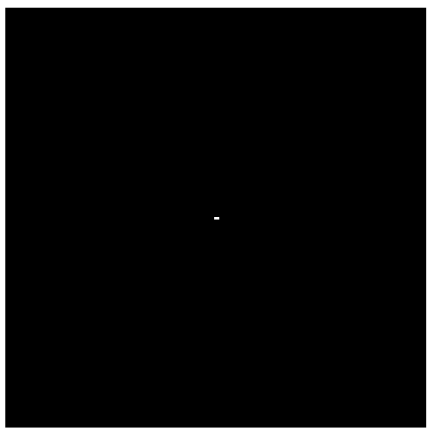
Figure 4E:
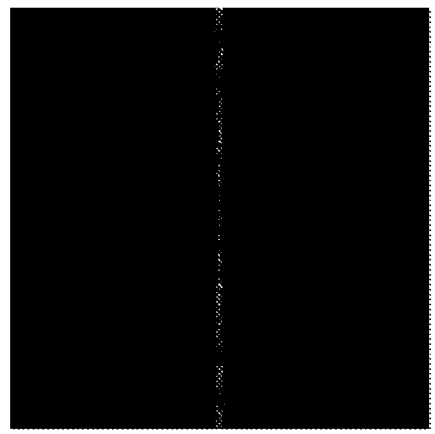
Figure 4A:
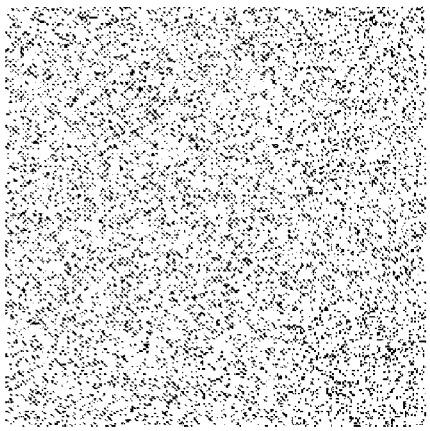
Figure 4D:
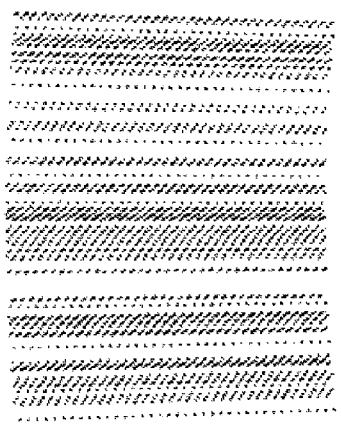
Figure 4I:
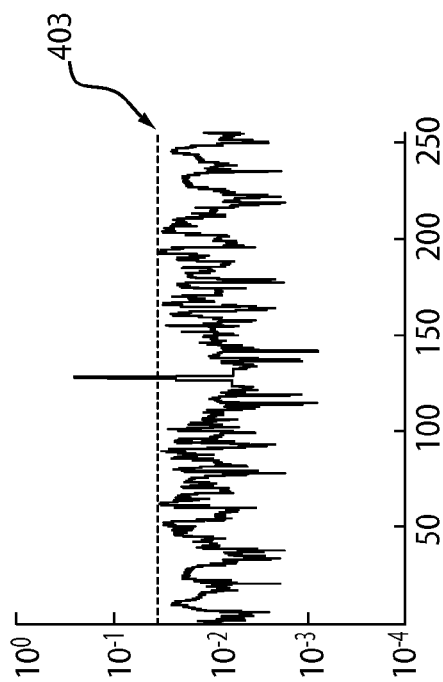
Figure 4H:
Figure 4G:
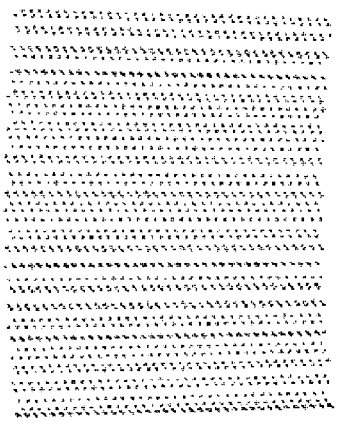

FIGS. 4A, 4B, 4C, 4D, 4E, 4F, 4G, 4H, and 4I illustrate point spread functions for random two-dimensional undersampling, random slow-time undersampling, and jittered slow-time undersampling, according to an embodiment of the invention. More specifically, FIGS. 4A, 4B, and 4C illustrate a point spread function for pure two-dimensional random sampling where samples are chosen randomly from a Cartesian grid, used as a standard for comparison with the two slow-time undersampling methods previously described. FIGS. 4D, 4E and 4F illustrate a point spread function for random slow-time undersampling, in accordance with an embodiment of the invention. FIGS. 4G, 4H, and 4I illustrate a point spread function for jilted slow-time undersampling, in accordance with an alternate embodiment of the invention. In each case, a sparsifying transform, TPSF, can be used to analyze the aliasing artifacts.

FIGS. 4A, 4D, and 4G illustrate the two-dimensional points selected randomly according to each respective undersampling method. FIGS. 4B, 4E, and 4H illustrate the aliasing effects produced by each respective undersampling method. FIGS. 4C, 4F, and 4I illustrate a graph that measures the severity of the aliasing effects produced by each respective undersampling method. Each of FIGS. 4C, 4F, and 4I includes a line that measures the effect of the aliasing artifact (i.e., lines 401, 402, and 403), where a height of the line represents a severity of the aliasing artifact.

According to an embodiment of the invention, by undersampling waveform measurements along a slow-time axis, one-dimensional sparsity can be exploited in two-dimensional space. Furthermore, according to the embodiment, the artifacts introduced by random or jittered slow-time undersampling can be removed using a nonlinear reconstruction technique promoting sparsity, as will be discussed in greater detail.

According to an embodiment of the invention, given partial Fourier measurements of a reflectivity map to be imaged, a nonlinear reconstruction technique can be used to reconstruct a SAR image.

In accordance with an embodiment, r represents a collection of two-dimensional waveform measurements, and $\tilde{S}=F_\Omega g \in C^M$ represents a collection of waveform measurements restricted to $\Omega$ (i.e., partial Fourier measurements of a reflectivity function g obtained by incorporating one of the slow-time undersampling methods previously discussed). Using equation (5), $\tilde{S}$ can be represented as $Rr=RAg$, where R is a restriction operator that selects the waveform measurements from the SAR model and $F_\Omega=RA$. According to the embodiment, g has a sparse representation (or is compressible) in some basis $\Psi$, so that $g=\Psi v$. In addition, the measurements can be assumed to be noisy. That is, the collection of two-dimensional waveform measurements can be represented as:

$$\tilde{S}=F_\Omega g+\eta, \qquad (8)$$

where $\eta$ is an arbitrary noise vector with $\|\eta\|_2 \leq \epsilon$. The reflectivity map g can be estimated via v by solving the following $l_1$ minimization algorithm:

$$v_{rec} = \arg\min_{v'} \|v'\|_1 \text{ s.t.} \|\tilde{S} - F_\Omega \Psi v'\|_2 \leq \epsilon, \qquad (9)$$

where $\|\cdot\|_2$ denotes the $l_2$ norm. According to an embodiment, the solution to equation (9) can estimate the unknown reflectivity map with an error that is bounded by two terms. The first term is due to noise and is proportional to the size of the noise perturbation and the second term is due to the approximation error. That is, if $v_K$, represents a truncated vector corresponding to the K largest values of v in magnitude, then:

$$\|v_{rec} - v\|_2 \leq C_{1,K}\epsilon + C_{2,K} \frac{\|v-v_K\|_1}{\sqrt{K}}, \qquad (10)$$

where $C_{1,K}$ and $C_{2,K}$ depend on restricted isometry constants.

According to an embodiment, an implementation of a nonlinear recovery scheme described above can utilize a reformulation that includes an operator that maps phase history data into an image domain.

In accordance with an embodiment, if the noise is Gaussian with mean zero and variance $\sigma^2$, $\eta \sim N(0,\sigma^2)$, then the reflectivity field can be recovered in a stable manner by solving a modified optimization algorithm:

$$v_{rec} = \arg\min_{v'} \|v'\|_1 \text{ s.t.} \|\Psi^T F_\Omega^T (\tilde{S} - F_\Omega \Psi v')\|_\infty \leq \epsilon', \qquad (11)$$

where $\epsilon'=\lambda_N \sigma$ for some $\lambda_N>0$ and $\|\cdot\|_\infty$ denotes the $l_\infty$. The above program is known as the Dantzig Selector.

In an alternate embodiment, the following modified optimization algorithm can be used to estimate the reflectivity field:

$$v_{rec} = \underset{v'}{\arg\min} \|v'\|_1 \text{ s.t.} \|\Psi^T(\tilde{S} - F_\Omega \Psi v')\|_\infty \leq \varepsilon', \quad (12)$$

Figure 5:
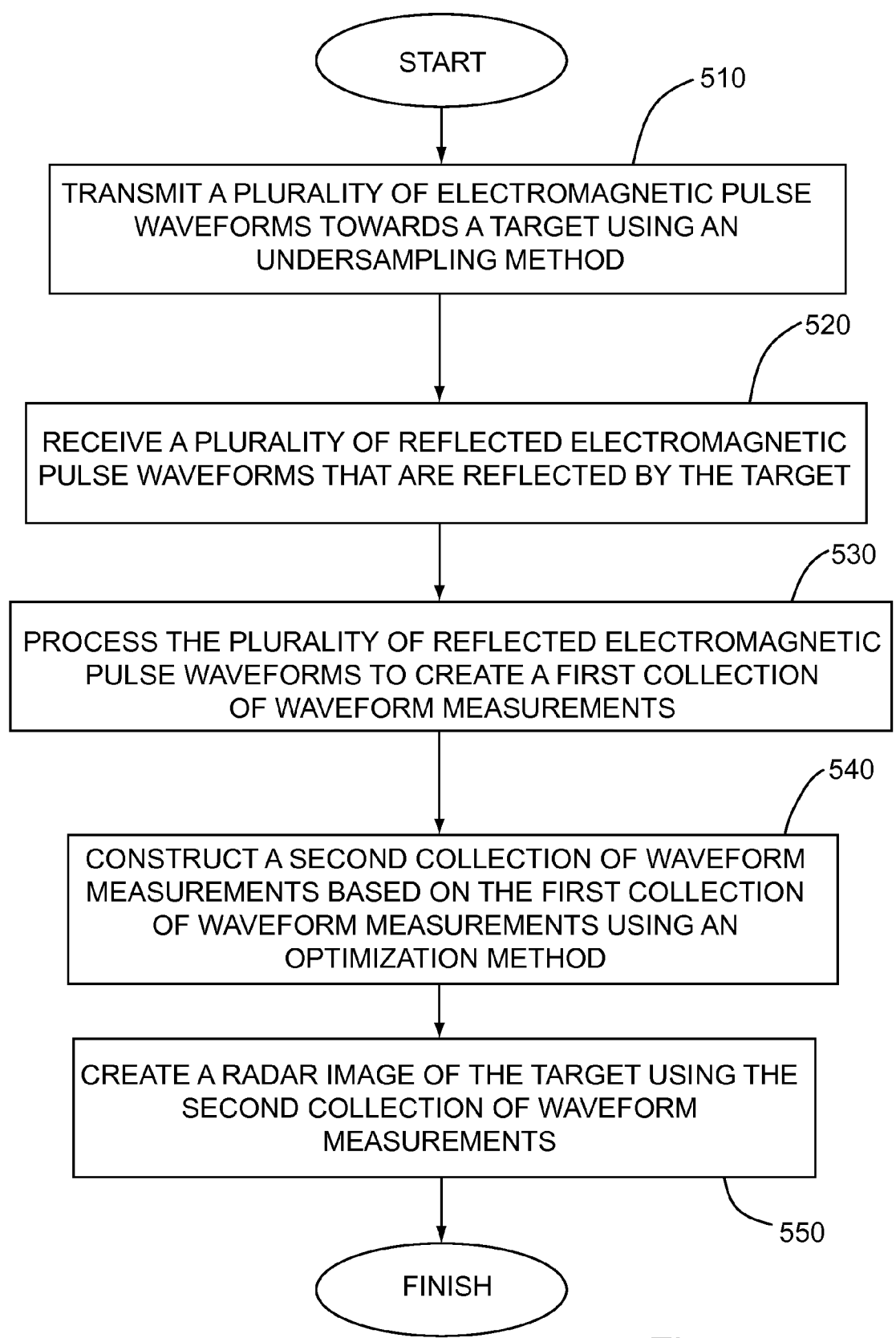
FIG. 5 illustrates a method according to an embodiment of the invention.

FIG. 5 illustrates a method according to an embodiment of the invention. According to an embodiment, the method can be performed by a radar that is mounted to a moving platform, such as an automobile, aircraft, or spacecraft. In another embodiment, the method can be performed by a radar that is mounted to a stationary platform. At step 510, a plurality of electromagnetic pulse waveforms are transmitted towards a target using an undersampling method. A target can be any object, region, or terrain. In one embodiment, involving a radar mounted to a moving platform, the target is a stationary target. In another embodiment, involving a radar mounted to a stationary platform, the target is a moving target. The undersampling method can involve transmitting fewer electromagnetic pulse waveforms then a sampling method, so that fewer waveform measurements are produced as compared to waveform measurements produced by a sampling method.

In one embodiment, the undersampling method is a random undersampling method, such as a random slow-time undersampling method. According to the embodiment, the random undersampling method includes transmitting each electromagnetic pulse waveform of the plurality of electromagnetic pulse waveforms at a non-regular pulse repetition interval. The non-regular pulse repetition interval can break up a periodicity of aliasing artifacts and can convert strong aliases to random noise-like artifacts.

In an alternate embodiment, the undersampling method is a jittered undersampling method, such as a jittered slow-time undersampling method. According to the embodiment, the jittered undersampling method includes jittering every nth transmission of an electromagnetic pulse waveform by an amount $\zeta_n$ so that the transmission occurs at time $nP+\zeta_n$, where P is a sampling period. The jittering can attenuate high frequencies, where energy lost to the attenuation appears as uniform nose, and can help maintain a basic structure of a spectrum.

At step 520, a plurality of reflected electromagnetic pulse waveforms that are reflected by the target are received. The reflected electromagnetic pulse waveforms are the original electromagnetic pulse waveforms that are transmitted in step 510, that have been reflected by the target when then come into contact with the target.

At step 530, the plurality of reflected electromagnetic pulse waveforms are processed to create a first collection of waveform measurements. According to the embodiment, each reflected electromagnetic pulse waveform is converted into a waveform measurement. In one embodiment, each reflected electromagnetic pulse waveform is converted into a waveform measurement by mixing the reflected electromagnetic pulse waveform with a target electromagnetic pulse waveform and low-pass filtering the mixed electromagnetic pulse waveform. According to the embodiment, the target electromagnetic pulse waveform simulates a return electromagnetic pulse waveform from a reference point of the target.

According to an embodiment, the first collection of waveform measurements is a compressed representation of a second collection of waveform measurements. In other words, a second collection of waveform measurements is a sparse or compressible collection of waveform measurements that can be constructed from the first collection of waveform measurements.

At step 540, a second collection of waveform measurements is constructed based on the first collection of waveform measurements using an optimization method. The optimization method includes estimating any waveform measurements of the second collection of waveform measurements not present in the first collection of waveform measurements. According to an embodiment, the optimization method includes a basis pursuit algorithm. In an alternate embodiment, the waveform measurements are noisy measurements, and the optimization method includes a basis pursuit denoising algorithm. In another alternate embodiment, the optimization method includes an orthogonal matching pursuit algorithm. In yet another alternate embodiment, the optimization method includes a Dantzig selector algorithm.

At step 550, a radar image of the target is created using the second collection of waveform measurements. In an embodiment of the invention, the radar image is a synthetic aperture radar image. In one embodiment of the invention, the creating of the radar image includes interpolating the second collection of waveform measurements to a Cartesian grid and taking a two-dimensional inverse Fourier transform of the second collection of waveform measurements.

The steps of a method or algorithm described in connection with the embodiments disclosed herein may be embodied directly in hardware, in a computer program executed by a processor, or in a combination of the two. A computer program may be embodied on a computer-readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components. Furthermore, a computer-readable medium may be any type of tangible medium.

Figure 6:
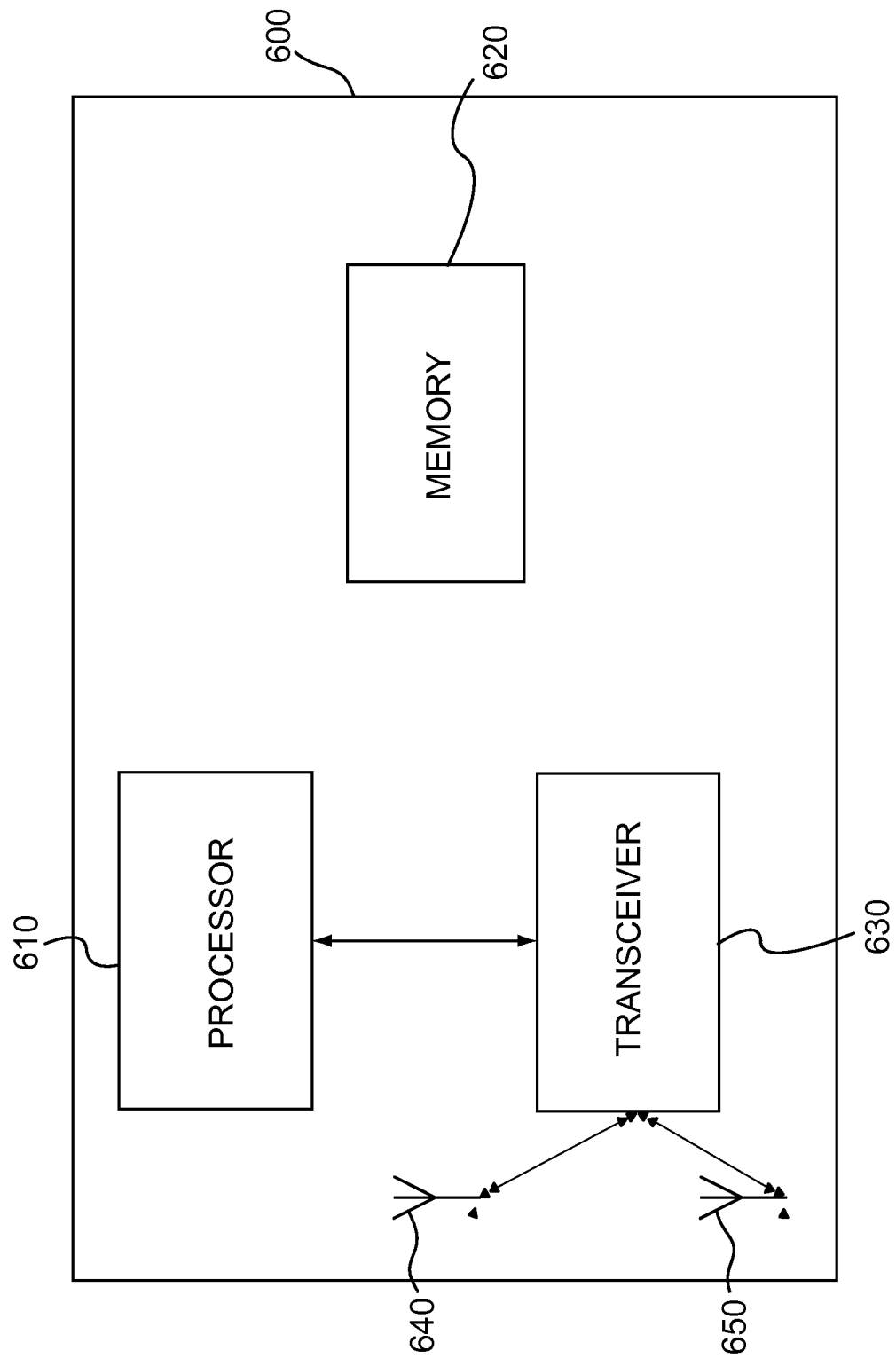
FIG. 6 illustrates an apparatus according to an embodiment of the invention.

FIG. 6 illustrates an apparatus 600 according to an embodiment of the invention. According to an embodiment, apparatus 600 is a radar that is mounted to a moving platform, such as an automobile, aircraft, or spacecraft. According to an alternate embodiment, apparatus 600 is a radar that is mounted to a stationary platform.

Apparatus 600 can include a processor 610 and a memory 620, in accordance with the embodiment. Processor 610 can read information from, and write information to, memory 620. Processor 610 can be a front end processor, a back end processor, a microprocessor, a digital signal processor, a processor with an accompanying digital signal processor, a special-purpose computer chip, a field-programmable gate array (FPGA), a controller, an ASIC, or a computer. Memory 620 can be RAM, flash memory, ROM, EPROM, EEPROM, registers, hard disk, a removable disk, a CD-ROM, or any other form of storage medium known in the art. Memory 620 can include computer program code, such as instructions for other components of apparatus 600. As one of ordinary skill in the art would readily appreciate, apparatus 600 can include any number of processors in alternative embodiments. Likewise, apparatus 600 can include any number of memories in alternative embodiments.

Apparatus 600 can also include a transceiver 630, which is configured to transmit and receive an electromagnetic pulse waveform, and which is connected to processor 610, in accordance with the embodiment. In an alternative embodiment, apparatus 600 can include a transmitter and receiver (not shown) in place of transceiver 630, where the transmitter is configured to transmit an electromagnetic pulse waveform, where the receiver is configured to receive an electromagnetic pulse waveform, and where the transmitter and the receiver are separate components. According to an embodiment, apparatus 600 can also include antennas 640 and 650, where each antenna is configured to assist transceiver 630 (or the transmitter and the receiver, in an alternate embodiment) in the transmitting and receiving of an electromagnetic pulse waveform. While the illustrated embodiment in FIG. 6 depicts two antennas, one of ordinary skill in the art would readily appreciate that apparatus 600 can include any number of antennas in alternative embodiments. In an alternative embodiment, apparatus 600 can include a single antenna.

According to an embodiment, transceiver 630 can transmit a plurality of electromagnetic pulse waveforms towards a target using an undersampling method. A target can be any object, region, or terrain. In one embodiment, where apparatus 600 is a radar mounted to a moving platform, the target is a stationary target. In another embodiment, where apparatus 600 is a radar mounted to a stationary platform, the target is a moving target. The undersampling method can involve transceiver 630 transmitting fewer electromagnetic pulse waveforms then transceiver 630 would transmit using a sampling method, so that fewer waveform measurements are produced as compared to waveform measurements produced by a sampling method.

In one embodiment, the undersampling method is a random undersampling method, such as a random slow-time undersampling method. According to the embodiment, transceiver 630 can transmit each electromagnetic pulse waveform of the plurality of electromagnetic pulse waveforms at a non-regular pulse repetition interval. The non-regular pulse repetition interval can break up a periodicity of aliasing artifacts and can convert strong aliases to random noise-like artifacts.

In an alternate embodiment, the undersampling method is a jittered undersampling method, such as a jittered slow-time undersampling method. According to the embodiment, transceiver 630 can jitter every nth transmission of an electromagnetic pulse waveform by an amount $\zeta_n$, so that the transmission occurs at time $nP+\zeta_n$, where P is a sampling period. The jittering can attenuate high frequencies, where energy lost to the attenuation appears as uniform nose, and can help maintain a basic structure of a spectrum.

According to an embodiment, transceiver 630 can receive a plurality of reflected electromagnetic pulse waveforms that are reflected by the target. The reflected electromagnetic pulse waveforms are the original electromagnetic pulse waveforms that are transmitted by transceiver 630, that have been reflected by the target when then come into contact with the target.

According to an embodiment, processor 610 can process the plurality of reflected electromagnetic pulse waveforms to create a first collection of waveform measurements. According to the embodiment, processor 610 can convert each reflected electromagnetic pulse waveform into a waveform measurement. In one embodiment, processor 610 can convert each reflected electromagnetic pulse waveform into a waveform measurement by mixing the reflected electromagnetic pulse waveform with a target electromagnetic pulse waveform and low-pass filtering the mixed electromagnetic pulse waveform. According to the embodiment, the target electromagnetic pulse waveform simulates a return electromagnetic pulse waveform from a reference point of the target.

According to an embodiment, the first collection of waveform measurements is a compressed representation of a second collection of waveform measurements. In other words, a second collection of waveform measurements is a sparse or compressible collection of waveform measurements that can be constructed from the first collection of waveform measurements.

According to an embodiment, processor 610 can construct a second collection of waveform measurements based on the first collection of waveform measurements using an optimization method. By using an optimization method, processor 610 can estimate any waveform measurements of the second collection of waveform measurements not present in the first collection of waveform measurements. According to an embodiment, the optimization method includes a basis pursuit algorithm. In an alternate embodiment, the waveform measurements are noisy measurements, and the optimization method includes a basis pursuit de-noising algorithm. In another alternate embodiment, the optimization method includes an orthogonal matching pursuit algorithm. In yet another alternate embodiment, the optimization method includes a Dantzig selector algorithm.

According to an embodiment, processor 610 can create a radar image of the target using the second collection of waveform measurements. In an embodiment of the invention, the radar image is a synthetic aperture radar image. In one embodiment of the invention, processor 610 can create the radar image by interpolating the second collection of waveform measurements to a Cartesian grid and taking a two-dimensional inverse Fourier transform of the second collection of waveform measurements.

A demonstration of the performance and applicability of the novel compressive imaging method on synthetic and real SAR data will now be discussed. The demonstration compares the novel compressing imaging method with a traditional imaging method, in particular, a PFA. The demonstration includes four experiments conducted using the novel compressing imaging method.

The first experiment involved nine point targets with unit magnitude used to generate a collection of waveform measurements and to reconstruct an image from the collection of page histories, in accordance with an embodiment of the invention. The parameters used in the experiment are summarized in the following table:

| | |
|---|---|
| Center Frequency | $3.80 \times 10^9$ Hz |
| Pulse width | $1 \times 10^{-6}$ sec |
| Bandwidth | $1.34 \times 10^8$ Hz |
| A/D sampling rate | $1.85 \times 10^8$ Hz |
| Chirp rate | $1.34 \times 10^{14}$ Hz/sec |
| Aperture length | 102 m |

FIGS. 7A, 7B, 7C, 7D, and 7E illustrate examples of collected waveform measurements and images reconstructed from the collected waveform measurements using an undersampling method, as compared to a traditional sampling method, applied toward the nine point targets, according to an embodiment of the invention.

Figure 7A:
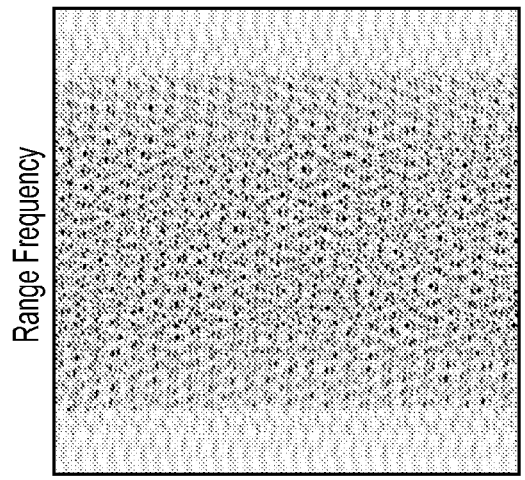
FIGS. 7A, 7B, 7C, 7D, and 7E illustrate examples of collected waveform measurements and images reconstructed from the collected waveform measurements using an undersampling method, as compared to a traditional sampling method, according to an embodiment of the invention.
Figure 7B:
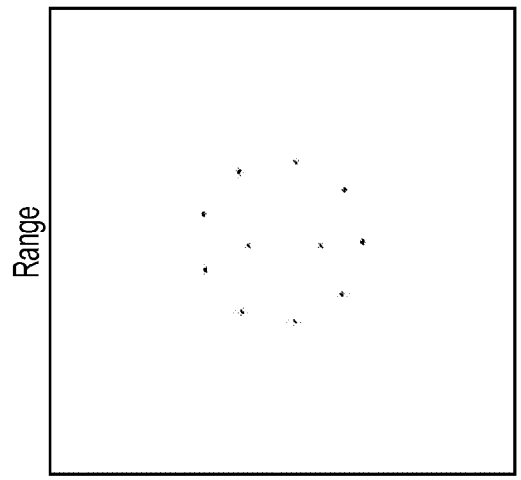
Figure 7C:
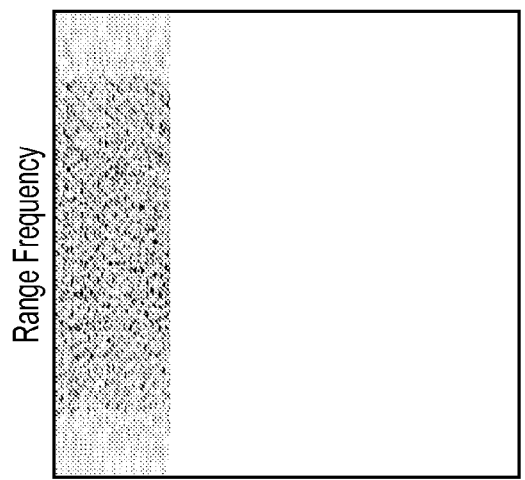
Figure 7D:
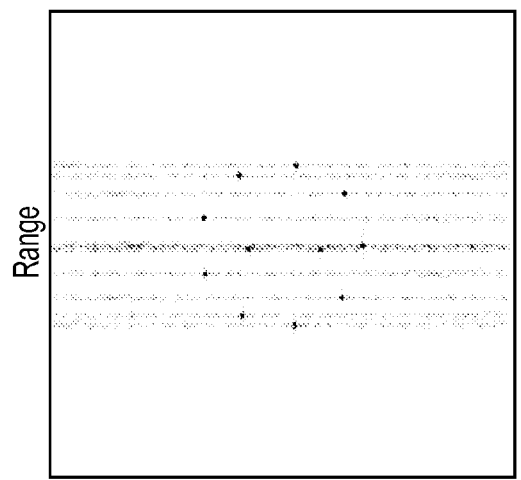
Figure 7E:
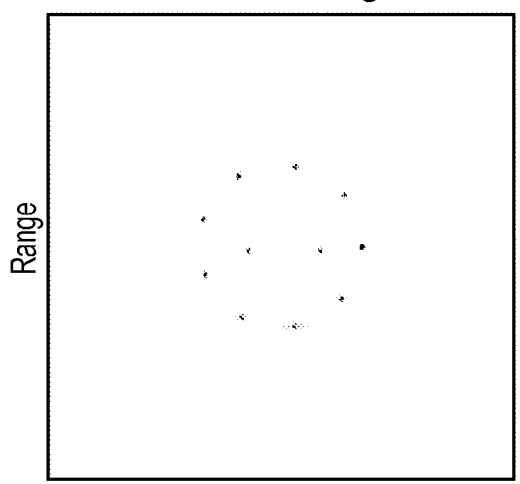

FIG. 7A illustrates a collection of generated waveform measurements for the nine point targets using traditional sampling (i.e. using 100% of the data). FIG. 7B illustrates a traditional image reconstruction of the point targets from the full simulated data using a PFA. FIG. 7C illustrates a collection of generated waveform measurements for the nine point targets using 75% random slow-time undersampling (i.e. using 25% of the data), according to an embodiment of the invention. FIG. 7D illustrates a traditional image reconstruction of the point targets from the compressive measurements (i.e., the 25% data) using a PFA. FIG. 7E illustrates an image reconstruction of the point targets from the compressive measurements (i.e., the 25% data) using a novel image reconstruction method according to an embodiment of the invention. According to the embodiment, as illustrated in FIG. 7, the novel image reconstruction method can reconstruct an image from the compressive measurements that is as clear as the PFA does from the full simulated data.

In an embodiment of the invention, the first experiment utilized $\Psi$ as an identity matrix. In accordance with the embodiment, the first experiment also employed a highly efficient algorithm that is suitable for large scale applications known as the spectral projected gradient (SPGL1) algorithm with a min-max NUFFT as a non-uniform Fourier transform and a non-linear conjugate gradient solver. Furthermore, according to the embodiment, the Peak Sidelobe Ratio (PSR) and the Integrated Sidelobe Ratio (ISLR) were used as measures of performance to evaluate the reconstructed point targets. The PSR determines the difference between the mainlobe and the most prominent sidelobe. The ISLR measures the ratio of all energy in the mainlobe to the total energy in all the sidelobes. A point target located at a top of the image was used for comparison. Because the reconstructed point response is a two-dimensional entity, principle axis cuts (i.e., the range-cut and the cross-range cut) were used to analyze the PSR and the ISLR of both the traditional image reconstruction method based on full measurements and the novel image reconstruction method based on compressed measurements. As can be seen in the below table, there was little degregation in the range-cut and cross-range-cut measurements:

|  | Traditional | | Compressed Sensing | |
| --- | --- | --- | --- | --- |
|  | PSR | ISLR | PSR | ILSR |
| Range | −29.64 | −23.31 | −29.63 | −23.33 |
| Cross-range | −35.5 | −28.29 | −34.9 | −27.94 |

The second experiment involved ISAR data that was collected on a SAAB 9000 car using System Planning Corporation's Mark IV radar, in accordance with an embodiment of the invention. According to the embodiment, an image was reconstructed after 60% jittered slow-time undersampling was applied to the data (i.e., 40% of the data was used).

FIGS. 8A, 8B, 8C, 8D, and 8E illustrate examples of collected waveform measurements and images reconstructed from the collected waveform measurements using an undersampling method, as compared to a traditional sampling method, applied to ISAR data, according to another embodiment of the invention.

Figure 8E:
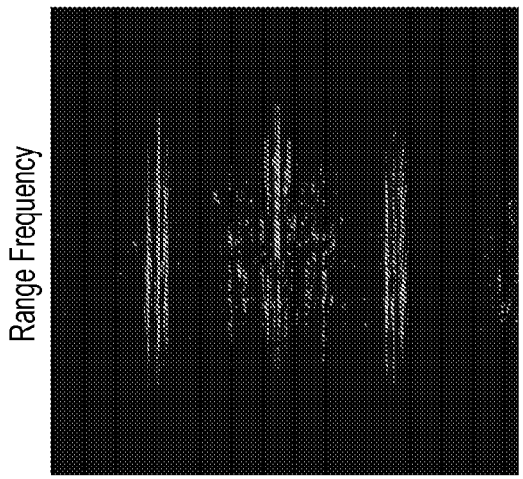
Figure 8E:
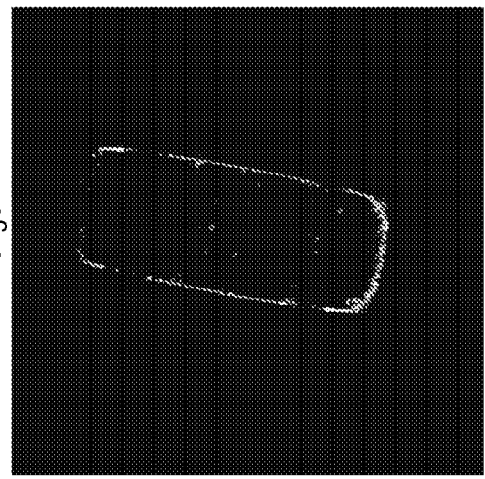
Figure 8E:
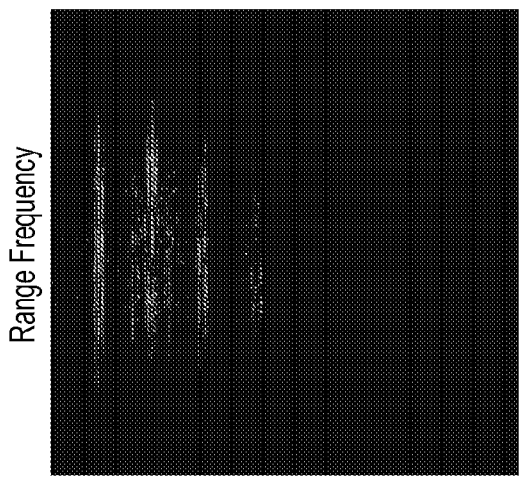
Figure 8E:
Figure 8E:
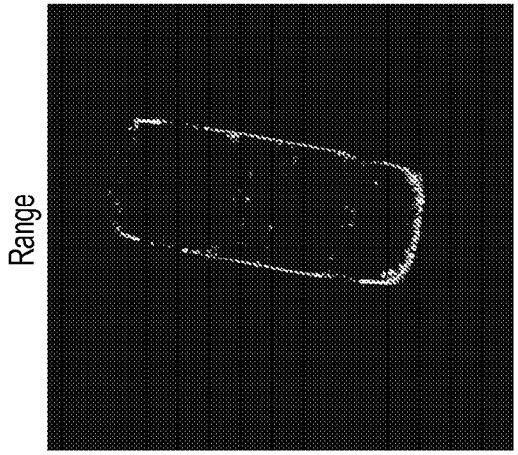

FIG. 8A illustrates a collection of generated waveform measurements using traditional sampling (i.e. using 100% of the data). FIG. 8B illustrates a traditional image reconstruction of the point targets from the full simulated data using a PFA. FIG. 8C illustrates a collection of generated waveform measurements using 60% jittered slow-time undersampling (i.e., using 40% of data), according to an embodiment of the invention. FIG. 8D illustrates a traditional image reconstruction from the compressive measurements (i.e., the 40% data) using a PFA. FIG. 8E illustrates an image reconstruction from the compressive measurements (i.e., the 40% data) using a novel image reconstruction method according to an embodiment of the invention. According to the embodiment, the reconstructed image from the compressed measurements using the novel method, illustrated in FIG. 8E, is identical to the image reconstructed from the full measurements using the traditional PFA, illustrated in FIG. 8B. Furthermore, FIG. 8D illustrates how the traditional image reconstruction using the PFA fails to recover the ISAR image from the compressive measurements illustrated in FIG. 8C.

The third experiment involved a SAR image from a Moving and Stationary Target Recognition Program (MSTAR) public target database. According to the embodiment, an image was reconstructed after 45% jittered slow-time undersampling was applied to the data (i.e., 55% of the data was used). For the third experiment, instead of solving equation (9), the following modified program was solved:

$$v_{rec} = \underset{v'}{\arg\min} \|v'\|_1 + \alpha TV(g) \text{s.t.} \|\tilde{s} - F_\Omega \Psi v'\|_2 \le \varepsilon, \quad (13)$$

where TV (g) is a total variation, which can be viewed as a $l_1$ norm of a gradient. The third experiment also used Daubechies 4 wavelet as a sparsifying transform.

Figure 9A:
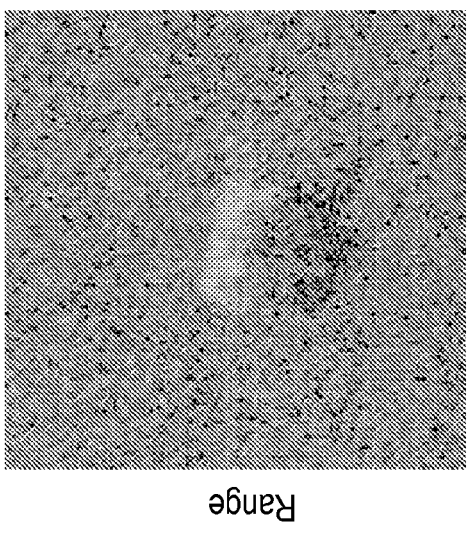
FIGS. 9A, 9B, and 9C illustrate examples of images reconstructed from collected waveform measurements using an undersampling method, as compared to a traditional sampling method, according to another embodiment of the invention.
Figure 9B:
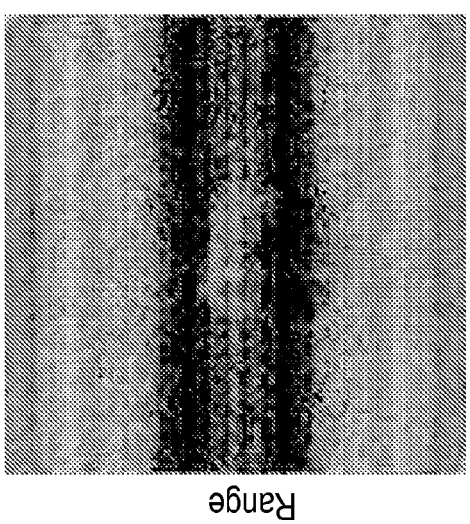
Figure 9C:
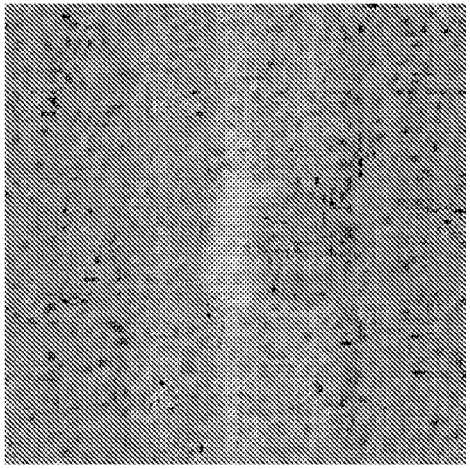

FIGS. 9A, 9B, and 9C illustrate examples of images reconstructed from collected waveform measurements using an undersampling method, as compared to a traditional sampling method, applied to a MSTAR public target database, according to another embodiment of the invention.

FIG. 9A illustrates a traditional image reconstruction of a SAR image using full simulated data and using a PFA. FIG. 9B illustrates a traditional image reconstruction of the SAR image after 45% jittered slow-time undersampling (i.e., 55% of data used) using a PFA. FIG. 9C illustrates an image reconstruction of the SAR image after 45% jittered slow-time undersampling (i.e., 55% of the data used) using a novel image reconstruction method according to an embodiment of the invention. According to the embodiment, the image reconstruction method solves equation (13). Also according to the embodiment, the novel image reconstruction method can estimate a reflectively field close to the reflectivity field obtained from the full simulated data, as illustrated in FIGS. 9A and 9C.

The fourth experiment involved real B-727 ISAR data. According to the embodiment, an image was reconstructed using 70% random slow-time undersampled waveform measurements (i.e., 30% of the data was used).

Figure 10A:
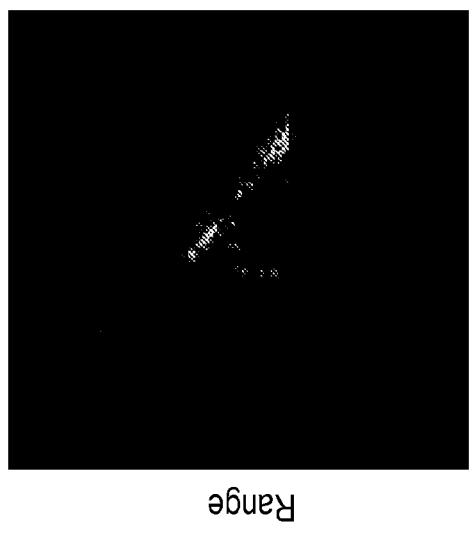
FIGS. 10A, 10B, and 10C illustrate examples of images reconstructed from collected waveform measurements using an undersampling method, as compared to a traditional sampling method, according to another embodiment of the invention.
Figure 10B:
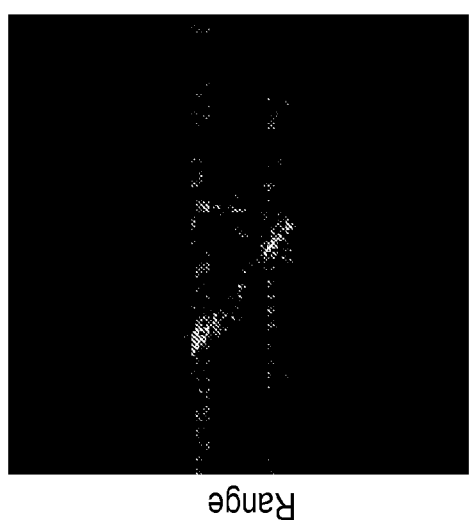
Figure 10C:
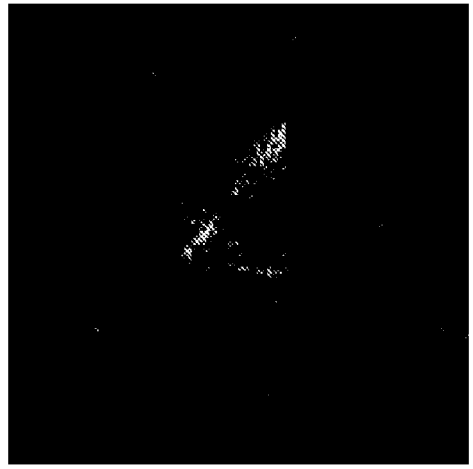

FIGS. 10A, 10B, and 10C illustrate examples of images reconstructed from collected waveform measurements using an undersampling method, as compared to a traditional sampling method, applied to ISAR data, according to another embodiment of the invention.

FIG. 10A illustrates a traditional image reconstruction of a SAR image using full simulated data and using a PFA. FIG. 10B illustrates a traditional image reconstruction of the SAR image after 70% jittered slow-time undersampling (i.e., 30% of data used) using a PFA. FIG. 10C illustrates an image reconstruction of the SAR image after 70% jittered slow-time undersampling (i.e., 30% of the data used) using a novel image reconstruction method according to an embodiment of the invention. As illustrated in FIGS. 10A and 10C, the novel image reconstruction method can provide as good a reconstruction based on compressed measurements as compared to a tradition image reconstruction method based on full measurements.

While a theoretical bound on the number of Fourier samples that need to be measured for a good reconstruction has been derived, in practice, Fourier samples in the order of two to five times the number of sparse coefficient suffice for a good reconstruction. The four experiments described here involving the novel image reconstruction method support this practical position.

According to certain embodiments of the invention, by utilizing a basis pursuit denoising algorithm, or a Dantzig selector, the novel method of compressing a synthetic aperture can reconstruct an image as good, if not better, than traditional SAR reconstruction methods, and at a lower sampling rate. Thus, according to certain embodiments, the novel image reconstruction method can provide many advantages over traditional image reconstruction methods. Some of the advantages will now be described in greater detail.

In many military applications of SAR, a user encounters scenarios where the enemy uses a transmitting radar to send out a signal within the band of the SAR system transmitter to confuse the SAR receiver. This process is known as an Electronic Countermeasure (ECM). The ECM causes the SAR system to receive and process erroneous information, which obscures targets or features of interest.

ECM techniques used to jam a SAR system often rely on estimating radar signal parameters such as PRI by exploiting multiple transmissions of the signal at each synthetic aperture position. An elementary electronic counter-countermeasure (ECCM) can jitter the PRF of a SAR system in order to confuse an ECM. By jittering the PRF, each outgoing electromagnetic pulse waveform can either be delayed or not depending on a sequence generated by a random number generator. Another implementation for changing an inter-pulse period is to drop electromagnetic pulse waveforms randomly. Because the novel compressive aperture method can modify a PRI of a SAR system, the novel compressive aperture method can offer storing countermeasures resistance.

Figure 11:
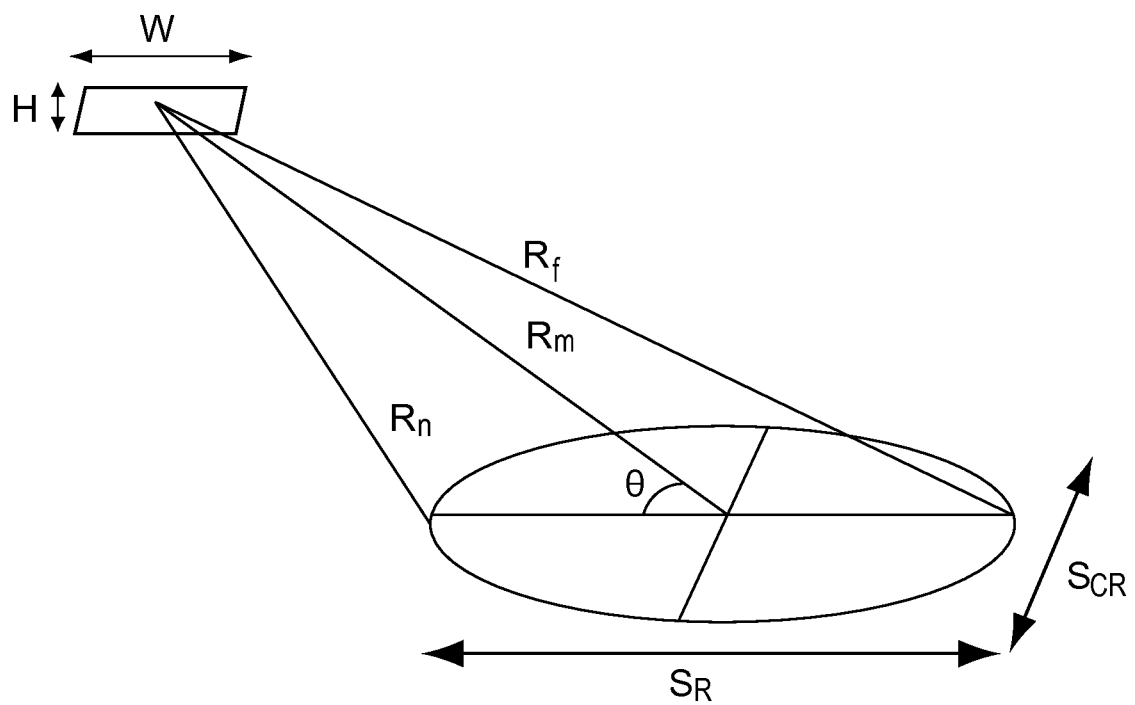
FIG. 11 illustrates geometry of a SAR imaging system according to an embodiment of the invention.

Another advantage, according to certain embodiments, is a reduction in radar antenna size. FIG. 11 illustrates geometry of a SAR imaging system according to an embodiment of the invention. As illustrated in FIG. 11, a SAR antenna of width W and height H, travelling at a constant velocity v, in a straight path, pointed orthogonal to the flight path illuminates the ground region with the range swath length $S_R$, and cross-range swatch length $S_{CR}$. The range swath length, in the beam limited radar case, is specified by the following equation:

$$S_R = \frac{\lambda R_m}{H \sin(\Theta)}. \tag{14}$$

For an unambiguous processing of range, the PRI is constrained by:

$$PRI \geq \frac{2 S_R}{c} = \frac{2}{c} \frac{\lambda R_m}{H \sin(\Theta)}, \tag{15}$$

which implies that:

$$H \geq \frac{2}{c} \frac{\lambda R_m}{\sin(\Theta) PRI}. \tag{16}$$

The swath length in the cross-range direction is specified by the following equation:

$$S_{CR} = \frac{\lambda R_m}{W}. \tag{17}$$

For a given spatial bandwidth B in cross-range, according to the Nyquist sampling theorem, to avoid aliasing, the following equation must hold:

$$B = \frac{1}{2}\left(\frac{1}{S_i}\right) \tag{18}$$
$$= \frac{1}{2}\frac{1}{(vPRI_{NYQ})},$$

where $S_i$ denotes a sampling interval in cross-range, and $PRI_{NYQ}$ stands for the Nyquist PRI. According to the theory of CS, if the reflectivity function is assumed to be sparse or compressible in some basis, then it is possible to sample at a much lower rate than that determined by the Nyquist theorem. For example, according to an embodiment, jittered undersampling can be applied which is at an average rate $$\frac{1}{D}$$

times the Nyquist rate. This means that:

$$PRI_{CS} = D(PRI_{NYQ}), \tag{19}$$

where $PRI_{CS}$ denotes the average value of the compressive undersampled inter-pulse times. Using equation (16) when compressive sampling is assume, one can obtain:

$$H \geq \frac{2}{c} \frac{\lambda R_m}{\sin(\Theta) PRI_{CS}}. \tag{20}$$

$$= \frac{1}{D}\left(\frac{2}{c} \frac{\lambda R_m}{\sin(\Theta) PRI_{NYQ}}\right) \tag{21}$$

Thus, according to an embodiment of the invention, an antenna height can be reduced by a factor of D, and an image can be reconstructed with a minor loss in signal-to-noise ratio when using compressive sampling.

In addition, in many SAR systems, radar data is directly stored on board and then transmitted to the ground in some reduced form. According to certain embodiments of the invention, the amount of data that is stored and transmitted is significantly reduced. In addition, according to certain embodiment, raw SAR data can be encoded using the novel compressed aperture method.

Finally, according to certain embodiments of the invention, by transmitting electromagnetic pulse waveforms at random PRIs, it is possible to image a much wider swath than possible by conventional methods. Thus, the novel image reconstruction method can achieve tasks achieved by traditional image reconstruction methods, but with an additional advantage of reduced data transmission.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   transmitting, by a transmitter or a transceiver of a device, a plurality of electromagnetic pulse waveforms towards a target using an undersampling method;
   receiving, by a receiver or the transceiver of the device, a plurality of reflected electromagnetic pulse waveforms that are reflected by the target;
   processing, by at least one hardware processor of the device, the plurality of reflected electromagnetic pulse waveforms to create a first collection of waveform measurements by converting each reflected electromagnetic pulse waveform into a waveform measurement, wherein the first collection of waveform measurements is a compressed representation of a second collection of waveform measurements;
   constructing, by the at least one hardware processor of the device, the second collection of waveform measurements based on the first collection of waveform measurements using an optimization method that comprises estimating any waveform measurements of the second collection of waveform measurements not present in the first collection of waveform measurements; and
   creating, by the at least one hardware processor of the device, a radar image of the target using the second collection of waveform measurements.

2. The method of claim 1, wherein the undersampling method comprises a random undersampling method that further comprises transmitting each electromagnetic pulse waveform at a non-regular pulse repetition interval.

3. The method of claim 1, wherein the undersampling method comprises a jittered undersampling method that further comprises jittering every nth transmission of an electromagnetic pulse waveform by an amount $\zeta_n$ so that the transmission occurs at time $nP+\zeta_n$, where P is a sampling period.

4. The method of claim 1, wherein the converting each reflected electromagnetic pulse waveform into a waveform measurement further comprises mixing the reflected electromagnetic pulse waveform with a target electromagnetic pulse waveform and low-pass filtering the mixed electromagnetic pulse waveform,
   wherein, the target electromagnetic pulse waveform simulates a return electromagnetic pulse waveform from a reference point of the target.

5. The method of claim 1, wherein the optimization method comprises a basis pursuit algorithm.

6. The method of claim 1, wherein the first collection of waveform measurements comprise noisy waveform measurements and the optimization method comprises a basis pursuit de-noising algorithm.

7. The method of claim 1, wherein the optimization method comprises an orthogonal matching pursuit.

8. The method of claim 1, wherein the optimization method comprises a Dantzig selector algorithm.

9. The method of claim 1, wherein the radar image comprises a synthetic aperture radar image.

10. An apparatus, comprising:
    a memory comprising instructions;
    a transceiver configured to transmit a plurality of electromagnetic pulse waveforms towards a target using an undersampling method;
    wherein the transceiver is further configured to receive a plurality of reflected electromagnetic pulse waveforms that are reflected by the target;
    a processor configured to process the plurality of reflected electromagnetic pulse waveforms to create a first collection of waveform measurements by converting each reflected electromagnetic pulse waveform into a waveform measurement, wherein the first collection of waveform measurements is a compressed representation of a second collection of waveform measurements;
    wherein the processor is further configured to construct the second collection of waveform measurements based on the first collection of waveform measurements using an optimization method, wherein the processor is further configured to estimate any waveform measurements of the second collection of waveform measurements not present in the first collection of waveform measurements; and
    wherein the processor is further configured to create a radar image of the target using the second collection of waveform measurements.

11. The apparatus of claim 10, wherein the undersampling method comprises a random undersampling method and the transceiver is further configured to transmit each electromagnetic pulse waveform at a non-regular pulse repetition interval.

12. The apparatus of claim 10, wherein the undersampling method comprises a jittered undersampling method and the transceiver is further configured to jitter every nth transmission of an electromagnetic pulse waveform by an amount $\zeta_n$ so that the transmission occurs at time $nP+\zeta_n$, where P is a sampling period.

13. The apparatus of claim 10, wherein the processor is further configured to mix the reflected electromagnetic pulse waveform with a target electromagnetic pulse waveform and low-pass filter the mixed electromagnetic pulse waveform,
    wherein, the target electromagnetic pulse waveform simulates a return electromagnetic pulse waveform from a reference point of the target.

14. The apparatus of claim 10, wherein the radar image comprises a synthetic aperture radar image.

15. A non-transitory computer-readable medium having a computer program stored thereon that, when executed by a processor, causes the processor to implement a method, the method comprising:
    transmitting a plurality of electromagnetic pulse waveforms towards a target using an undersampling method;
    receiving a plurality of reflected electromagnetic pulse waveforms that are reflected by the target;
    processing the plurality of reflected electromagnetic pulse waveforms to create a first collection of waveform measurements by converting each reflected electromagnetic pulse waveform into a waveform measurement, wherein the first collection of waveform measurements is a compressed representation of a second collection of waveform measurements;
    constructing the second collection of waveform measurements based on the first collection of waveform measurements using an optimization method that comprises estimating any waveform measurements of the second collection of waveform measurements not present in the first collection of waveform measurements; and creating a radar image of the target using the second collection of waveform measurements.

16. The non-transitory computer-readable medium of claim 15, wherein the undersampling method comprises a random undersampling method that comprises transmitting each electromagnetic pulse waveform at a non-regular pulse repetition interval.

17. The non-transitory computer-readable medium of claim 15, wherein the undersampling method comprises a jittered undersampling method that comprises jittering every nth transmission of an electromagnetic pulse waveform by an amount $\zeta_n$ so that the transmission occurs at time $nP+\zeta_n$, where P is a sampling period.

18. The non-transitory computer-readable medium of claim 15, wherein the converting each reflected electromagnetic pulse waveform into a waveform measurement further comprises mixing the reflected electromagnetic pulse waveform with a target electromagnetic pulse waveform and low-pass filtering the mixed electromagnetic pulse waveform, wherein, the target electromagnetic pulse waveform simulates a return electromagnetic pulse waveform from a reference point of the target.

19. The non-transitory computer-readable medium of claim 15, wherein the radar image comprises a synthetic aperture radar image.

\* \* \* \* \*